US012747182B2

(12) United States Patent
Letz et al.

(10) Patent No.: US 12,747,182 B2
(45) Date of Patent: Sep. 29, 2026

(54) USE OF A FLAT GLASS IN ELECTRONIC COMPONENTS

(71) Applicant: SCHOTT AG, Mainz (DE)

(72) Inventors: Martin Letz, Mainz (DE); Gerhard Lautenschläger, Jena (DE); Martun Hovhannisyan, Frankfurt am Main (DE); Matthias Jotz, Mainz (DE); Lutz Klippe, Wiesbaden (DE); Thomas Kloss, Jena/Cospeda (DE)

(73) Assignee: SCHOTT AG, Mainz (DE)

(*) Notice: Subject to any disclaimer, the term of this patent is extended or adjusted under 35 U.S.C. 154(b) by 543 days.

(21) Appl. No.: 16/414,995

(22) Filed: May 17, 2019

(65) Prior Publication Data

US 2019/0352213 A1 Nov. 21, 2019

(30) Foreign Application Priority Data

May 18, 2018 (DE) ..................... 10 2018 112 069.9

(51) Int. Cl.

| | |
|---|---|
| ***C03B 29/02*** | (2006.01) |
| ***C03B 17/06*** | (2006.01) |
| ***C03C 3/089*** | (2006.01) |
| ***C03C 3/091*** | (2006.01) |
| ***C03C 4/00*** | (2006.01) |
| ***C03C 4/16*** | (2006.01) |
| ***H01Q 3/36*** | (2006.01) |
| ***H01Q 9/04*** | (2006.01) |
| ***H01Q 21/06*** | (2006.01) |

(52) U.S. Cl.

CPC .......... *C03B 29/025* (2013.01); *C03B 17/064* (2013.01); *C03C 3/091* (2013.01); *C03C 4/0085* (2013.01); *C03C 4/0092* (2013.01); *C03C 4/16* (2013.01); *C03C 3/089* (2013.01); *H01Q 3/36* (2013.01); *H01Q 9/0407* (2013.01); *H01Q 21/065* (2013.01)

(58) Field of Classification Search

CPC ..... C03C 3/091; C03C 33/083; C03C 33/089; C03C 4/0085; C03C 14/006; C03C 4/16; C03C 3/089; C03C 4/0092; H01B 3/08; H01Q 1/38; H01Q 9/0407; H01Q 21/065; H01Q 3/36; G02F 1/01

See application file for complete search history.

(56) References Cited

U.S. PATENT DOCUMENTS

| | | | | | |
|---|---|---|---|---|---|
| 3,994,708 | A | | 11/1976 | von Reth | |
| 4,298,389 | A | * | 11/1981 | Johnson | C03C 3/091 501/77 |
| 4,792,535 | A | | 12/1988 | Fine | |
| 4,925,814 | A | | 5/1990 | Fine | |
| 5,045,509 | A | | 9/1991 | Kiefer | |
| 5,204,289 | A | * | 4/1993 | Moh | C03C 14/004 501/39 |
| 5,219,801 | A | | 6/1993 | Shorrock | |
| 5,256,470 | A | * | 10/1993 | Jean | C03C 8/22 428/209 |
| 5,260,119 | A | * | 11/1993 | Jean | H05K 1/0306 428/209 |
| 5,547,904 | A | | 8/1996 | Watzke | |
| 5,599,753 | A | * | 2/1997 | Watzke | C03C 3/093 501/905 |
| 5,599,756 | A | * | 2/1997 | Matsuo | C04B 35/119 501/127 |
| 5,610,108 | A | * | 3/1997 | Watzke | C03C 3/091 501/59 |
| 5,656,558 | A | | 8/1997 | Brix | |
| 5,710,082 | A | * | 1/1998 | Kawakami | H01B 3/087 501/65 |
| 5,757,611 | A | * | 5/1998 | Gurkovich | H01L 23/49822 361/321.5 |
| 7,022,251 | B2 | * | 4/2006 | Casey | H05K 3/06 216/96 |
| 7,838,452 | B2 | * | 11/2010 | Kurachi | B01L 3/5085 501/59 |
| 7,975,508 | B2 | * | 7/2011 | Akai | C03C 15/00 65/33.1 |

(Continued)

FOREIGN PATENT DOCUMENTS

| | | | | |
|---|---|---|---|---|
| CN | 1656612 | | 8/2007 | |
| CN | 101033114 A | * | 9/2007 | C03C 3/118 |

(Continued)

OTHER PUBLICATIONS

A. Mehmood et al., "Dielectric resonator antenna phased array with liquid crystal based phase shifters," The 8th European Conference on Antennas and Propagation (EuCAP 2014), 2014, pp. 2436-2439, doi: 10.1109/EuCAP.2014.6902310. (Year: 2014).*

Mehmood et al, Dielectric Resonator Antenna Phased Array with Liquid Crystal Based Phase Shifters, The 8th European Conference on Antennas and Propagation (EuCAP 2014), p. 2436-2439 (Year: 2014).*

Mehmood et al, Dielectric Resonator Antenna Phased Array with Liquid Crystal Based Phase Shifters, 2014, IEEE, 8th European Conference on Antennas and Propagation (EuCAP 2014) (Year: 2014).*

(Continued)

*Primary Examiner* — Alison L Hindenlang
*Assistant Examiner* — Steven S Lee
(74) *Attorney, Agent, or Firm* — Ruggiero McAllister & McMahon LLC

(57) ABSTRACT

A method of producing an electronic component is provided. The method includes providing flat glass having a dielectric constant of less than 4.3 and a dielectric loss factor of 0.004 or less at 5 GHz; configuring the flat glass as one of an interposer, a substrate, or a superstrate; and forming the interposer, the substrate, or the superstrate into the electronic component. The electronic component can be an antenna, a patch antenna, an array of antennas, a phase shifter element, and a liquid crystal-based phase shifter element.

22 Claims, No Drawings

(56) References Cited

U.S. PATENT DOCUMENTS

| | | | | |
|---|---|---|---|---|
| 8,273,671 | B2* | 9/2012 | Leib | H01L 23/10 428/209 |
| 8,697,590 | B2* | 4/2014 | Li | H05K 1/0366 501/36 |
| 9,145,333 | B1 | 9/2015 | Dejneka | |
| 2003/0096692 | A1* | 5/2003 | Wang | C03C 8/22 501/32 |
| 2004/0198580 | A1* | 10/2004 | Park | H01L 23/15 501/32 |
| 2005/0000248 | A1* | 1/2005 | Lauten-Schlaeger | C03B 5/225 65/60.1 |
| 2005/0175846 | A1* | 8/2005 | Mund | H01L 21/31616 428/432 |
| 2005/0204777 | A1* | 9/2005 | Mori | C03B 11/08 65/112 |
| 2006/0009343 | A1* | 1/2006 | Fechner | H01J 61/302 501/65 |
| 2006/0010917 | A1* | 1/2006 | Fechner | H01J 61/302 65/101 |
| 2007/0166520 | A1* | 7/2007 | Leib | H01L 23/66 428/209 |
| 2007/0190340 | A1* | 8/2007 | Coppola | C03B 17/064 428/432 |
| 2008/0295882 | A1* | 12/2008 | Stephens | H01L 31/046 136/258 |
| 2009/0109654 | A1* | 4/2009 | Fechner | C03C 3/095 313/112 |
| 2009/0129061 | A1* | 5/2009 | Fechner | C03C 3/097 501/63 |
| 2010/0045164 | A1* | 2/2010 | Fechner | C03C 3/105 313/493 |
| 2010/0255980 | A1* | 10/2010 | Fulton | C03C 3/087 501/64 |
| 2011/0134382 | A1* | 6/2011 | Miyakawa | G02F 1/134336 349/139 |
| 2011/0317329 | A1* | 12/2011 | Letz | C03C 3/091 361/321.5 |
| 2014/0061186 | A1 | 3/2014 | Laurent | |
| 2014/0117294 | A1 | 5/2014 | Kass | |
| 2014/0152914 | A1* | 6/2014 | King | G02B 6/0035 428/141 |
| 2015/0251845 | A1* | 9/2015 | Jotz | B65D 25/10 206/408 |
| 2015/0380789 | A1* | 12/2015 | Jakoby | H01P 1/184 343/905 |
| 2016/0176746 | A1* | 6/2016 | Hunzinger | C03B 23/02 65/53 |
| 2016/0176751 | A1* | 6/2016 | Lautenschlaeger | C03B 18/02 428/34.4 |
| 2016/0340227 | A1* | 11/2016 | Renz | C03C 23/002 |
| 2017/0052311 | A1* | 2/2017 | Lautenschläger | C03C 4/0092 |
| 2017/0225994 | A1* | 8/2017 | Buellesfeld | C03B 23/037 |
| 2017/0247284 | A1 | 8/2017 | Miyasaka | |
| 2017/0247285 | A1 | 8/2017 | Ellison | |
| 2018/0057393 | A1 | 3/2018 | Sakagami | |
| 2018/0082914 | A1 | 3/2018 | Hanawa | |
| 2018/0208500 | A1 | 7/2018 | Lee | |
| 2019/0169059 | A1* | 6/2019 | Fredholm | C03B 13/16 |
| 2019/0210911 | A1 | 7/2019 | Ono | |
| 2019/0352217 | A1* | 11/2019 | Lautenschläger | C03C 3/091 |

FOREIGN PATENT DOCUMENTS

| | | | | |
|---|---|---|---|---|
| CN | 103958428 | A * | 7/2014 | C03C 10/00 |
| DE | 2519505 | | 11/1975 | |
| DE | 3826586 | | 3/1989 | |
| DE | 3801840 | | 8/1989 | |
| DE | 4325656 | | 2/1995 | |
| DE | 4335204 | | 4/1995 | |
| DE | 4338128 | | 5/1995 | |
| DE | 69214985 | | 6/1997 | |
| DE | 10150884 | | 5/2003 | |
| DE | 10150884 | A1 * | 5/2003 | C03B 27/04 |
| DE | 102009021115 | | 11/2010 | |
| DE | 102012219614 | | 12/2013 | |
| DE | 102014119594 | | 6/2016 | |
| DE | 102016202685 | A1 * | 9/2016 | B32B 17/064 |
| DE | 202020107535 | U1 * | 6/2021 | A61L 2/0047 |
| EP | 0699636 | A1 * | 3/1996 | C03C 3/091 |
| EP | 1446362 | | 3/2005 | |
| EP | 2261183 | | 12/2010 | |
| JP | H08333157 | | 12/1996 | |
| JP | H08333157 | A * | 12/1996 | H05K 1/0306 |
| JP | 2727720 | B2 * | 3/1998 | B32B 15/04 |
| JP | 2005191088 | A * | 7/2005 | |
| JP | 2010208906 | | 9/2010 | |
| JP | 4569000 | B2 * | 10/2010 | C03C 14/004 |
| JP | 2011042508 | | 3/2011 | |
| JP | 2011042508 | A * | 3/2011 | |
| JP | 5540506 | | 7/2014 | |
| JP | 5540506 | B2 * | 7/2014 | |
| JP | 2014143288 | A * | 8/2014 | H03H 9/1014 |
| JP | 2015193521 | | 11/2015 | |
| JP | 2018039688 | | 3/2018 | |
| JP | 2018039688 | A * | 3/2018 | |
| WO | WO-9624163 | A1 * | 8/1996 | H01L 21/481 |
| WO | WO-9732821 | A1 * | 9/1997 | C03B 19/1453 |
| WO | WO-2004071982 | A1 * | 8/2004 | C03C 14/004 |
| WO | WO-2005063634 | A1 * | 7/2005 | C03B 5/43 |
| WO | 2012146860 | | 11/2012 | |
| WO | WO-2015194324 | A1 * | 12/2015 | B32B 17/10 |
| WO | 2016115685 | | 7/2016 | |
| WO | 2016190303 | | 12/2016 | |
| WO | 2017052338 | | 3/2017 | |
| WO | 2017070066 | | 4/2017 | |
| WO | 2017070500 | | 4/2017 | |
| WO | 2017119399 | | 7/2017 | |
| WO | 2016194780 | | 3/2018 | |
| WO | WO-2018051793 | A1 * | 3/2018 | C03B 17/02 |
| WO | 2018051793 | | 6/2019 | |

OTHER PUBLICATIONS

ISO 7991, "Glass-Determination of coefficient of mean linear thermal expansion", 1987, 4 pages (two-sided).

ISO 7884-8, Glass-Viscosity and viscometric fixed points—Part 8: Determination of (dilatometric) transformation temperature:, Feb. 1998, 7 pages.

DIN ISO 719 class HGB 1, "Glass-Hydrolytic resistance of glass grains at 98 degrees C-Method of test and classification", Second Edition, Oct. 1, 1985, 8 pages.

DIN 12116 class S 1 W, "Testing the resistance of glass to attack by boiling hrdrochloric acid solution, and classification", Mar. 2001, 5 pages.

DIN ISO 695 class A3, "Glass—Resistance to attack by a boiling aqueous solution of mixed alkali—Method of Test and classification", Third Edition, May 15, 1991, 8 pages.

N2, "Dielectric constant", 1991, with Partial English Translation, 8 Pages.

* cited by examiner

USE OF A FLAT GLASS IN ELECTRONIC COMPONENTS

CROSS REFERENCE TO RELATED APPLICATIONS

This application claims benefit under 35 USC § 119 of German Application No. 10 2018 112 069.92 filed May 18, 2018, the entire contents of which are incorporated herein by reference.

BACKGROUND

1. Field of the Invention

The invention relates to the use of a flat glass in electronic components, for example as a substrate or an interposer, in particular for high-frequency applications, as a substrate for antennas, in particular patch antennas, and as a substrate and superstrate for LC phase shifters (liquid crystal phase shifters).

2. Description of Related Art

The material class of glasses has long been known.

Flat glasses also have been state of the art for many years. Flat glass generally refers to a flat, in particular sheet-like or ribbon-shaped glass. Known manufacturing methods for flat glass include float processes, rolling processes, and drawing processes, such as down-draw processes or up-draw processes, for example.

Especially borosilicate glasses are of particular importance in the class of glasses. They are employed in a large variety of applications because of their special properties such as low susceptibility to temperature changes, high chemical resistance to a wide range of reagents and their good dimensional stability even at high temperatures. This glass system in particular allows to achieve specific properties, such as particularly high transmittance of the material in a specific range of wavelengths, for example in the NIR wavelength range from about 850 nm to about 1500 nm. So, because of the various options of adjusting the properties of the glass, a variety of applications and compositions of borosilicate glasses are known.

International patent application WO 2012/146860 A1 relates to the use of a borosilicate glass for induction applications and discloses both the use of an alkali borosilicate glass and the use of an alkali-free borosilicate glass. The use of borosilicate glass in particular appears advantageous because the material with low coefficients of thermal expansion, in particular expansion coefficients of $5.0*10^{-6}$/K, can be toughened thermally so that glass panels of sufficient hardness and strength for being used as a cooking surface are obtained.

Furthermore, German patent application DE 4325656 A1 discloses fire-resistant glazing of fire protection class G, in which alkali borosilicate glasses are highly toughened thermally. The Coefficient of Thermal Expansion (CTE) of such glasses is $4*10^{-6}$/K, for example. All the glasses have a rather high content of alkaline earth oxides and of ZnO and $ZrO_2$, ranging between 6 wt % and 10 wt %.

German patent application publication DE 101 50 884 A1 discloses an alkali borosilicate glass which is well suited for being toughened thermally. It has a coefficient of thermal expansion of $4*10^{-6}$/K, for example, and furthermore comprises the alkaline earth oxide CaO.

US 2017/0247284 A1 discloses borosilicate glasses for infrared applications such as cover plates for heaters. The examples given there for the embodiments of glasses 1 to 10 are alkali-free alkaline earth borosilicate glasses. Comparative examples 11 to 13 of US 2017/0247284 A1 include the Neoceram glass ceramic, a "Pyrex" type borosilicate glass, and an alkali-free borosilicate glass for TFT applications.

U.S. Pat. No. 9,145,333 B1 discloses compositions for alkali borosilicate glasses which are optimized for chemical toughening, that is to say for example with regard to the diffusion coefficient, compressive stress at the glass surface, etc.

Alkali borosilicate glasses also find application as a carrier substrate, for example for biochips or microarrays. For example, European patent EP 1 446 362 B1 describes such a glass. This glass exhibits low intrinsic fluorescence and good UV transparency. With regard to the content of color-imparting ions, there are only limits given for the $Fe_2O_3$ content (of less than 150 ppm), for octahedrally bound $Fe^{3+}$ of less than 10 ppm, and for $Cr^{3+}$ of less than 10 ppm and preferably even less than 2 ppm. Other color-imparting elements are not limited here, in particular the transition metals of the 3rd period (i.e. of atomic numbers 21 through 30, here in particular the metals from titanium to copper).

German patent application publication DE 10 2014 119 594 A1 relates to a borosilicate glass exhibiting low brittleness and high intrinsic strength and to the production and use thereof.

U.S. patent application US 2017/0052311 A1 discloses a glass for a light guide plate, which is an alkali borosilicate glass that is highly transparent for light in the wavelength range from 400 nm to 800 nm and free of selective unwanted light absorption. Light transmittance reducing ions of the 3d elements, such as Fe, Cr, Ni, Co, Cu, Mn, Ti, and V are said to amount to a total content of not more than 50 ppm. The content of divalent iron $Fe^{2+}$ is intended to be the lowest possible compared to the total iron content in the glasses of US 2017/0052311 A1.

U.S. patent application US 2017/0247285 A1 discloses light guide plates made of glass, wherein the glass is a high-alkali alkaline earth borosilicate glass. The glass exhibits high light transmittance in the wavelength range from 380 nm to 700 nm. For being chemically toughened, the $Na_2O$ contents are greater than 4 mol %. $B_2O_3$ contents are less than 10 mol % in each case. Although the contents of some 3d elements such as Co, Ni, and Cr are limited, other 3d elements are not considered at all, for example Cu, Mn, Ti, and V. The molar ratio of $Al_2O_3$ to $Na_2O$ is set to be approximately 1, due to the fact that particularly good toughening can be achieved in this way.

Japanese patent JP 5540506 relates to alkali borosilicate glasses which exhibit good UV transmittance and good solarization resistance. The $SiO_2$ content is at most 75 wt % here. In addition to $SnO_2$, the composition of these glasses also includes $Nb_2O_5$ and $As_2O_5$. The content of $Fe_2O_3$ is between 1 ppm and 50 ppm.

International patent application WO 2017/070500 A1 describes a glass substrate for use as a microarray for a fluorescence detection method, which may, for example, also be suitable for microscope carrier glasses, petri dishes or other glass slides, for example with textures applied thereto or therein. All described glass substrates compulsorily have a content of $B_2O_3$. The achieved expansion coefficients range between 4.9 and $8.0*10^{-6}$/K. Furthermore, the glasses described in WO 2017/070500 A1 contain $SnO_2$.

International patent application WO 2017/070066 A1 describes the production of light guide plates from glass substrates, the glasses corresponding to those of International patent application WO 2017/070500 A1. In particular, the $SiO_2$ contents are between 65.79 mol % and 78.17 mol %, and the contents of $B_2O_3$ are between 0 and 11.16 mol % for the glass compositions described in WO 2017/070066 A1.

Japanese patent application JP 2010/208906 A relates to a glass which is stable against UV radiation with a wavelength of 365 nm. The base glass is a soda-lime glass and does not contain $B_2O_3$. Solarization is prevented by addition of $TiO_2$ in a content from 0.2 wt % to 2.0 wt %, an iron oxide content from 0.01 wt % to 0.015 wt %, and a controlled set redox ratio of $Fe^{2+}/Fe^{3+}$. These measures are intended to suppress the reduction of transmittance caused by UV radiation in the visible spectral range (between about 380 nm and about 750 nm) to not more than 1%.

U.S. Pat. No. 4,298,389 discloses high transmittance glasses for solar applications. The optimized solar transmittance relates to the wavelength range from 350 nm to 2100 nm in this case. The base glass is an alumino-alkaline earth borosilicate glass with $B_2O_3$ contents from 2 wt % to 10 wt %. The $Fe_2O_3$ content is 200 ppm, with all iron being present in the trivalent oxidation state. UV transmittance is therefore extremely low.

U.S. patent application US 2014/0152914 A1 discloses a glass for application in touch screens, which is an aluminosilicate glass available under the brand "Gorilla" or trade name Gorilla glass.

European patent application EP 2 261 183 A2 discloses a highly transmissive glass sheet. The glass has a composition comprising $Na_2O$ and CaO as well as $SiO_2$ and is free of $B_2O_3$. After UV irradiation, i.e. irradiation with a wavelength of up to 400 nm, this sheet is said to exhibit no reduction in transmittance in the visible spectral range.

DE 692 14 985 T2 relates to a borosilicate glass composition which is said to exhibit high spectral transmittance in the visible range but low UV transmittance. Glass sheets with such a composition serve in particular as a cover glass for gallium arsenide solar cells. The borosilicate glass has a thermal expansion coefficient of 6.4 to $7.0*10^{-6}/K$. $CeO_2$ is used as a UV blocker.

German patent document DE 43 38 128 C1 describes borosilicate glasses exhibiting high transmittance in the UV range and a low coefficient of thermal expansion in the range between $3.2*10^{-6}/K$ and $3.4*10^{-6}/K$ as well as high chemical resistance. Metallic silicon is used as a reducing agent. As a result, the fraction of $Fe^{2+}$ compared to $Fe^{2+}$ is high, which reduces transmittance in the near IR range.

Furthermore, German patent document DE 43 35 204 C1 describes a reducing molten borosilicate glass with high transmittance in the UV range (85% at 254 nm and at a thickness of the glass of 1 mm). The $SiO_2$ content is between 58 wt % and 65 wt %, and the coefficient of thermal expansion is 5 to $6*10^{-6}/K$. Carbon was used as a reducing agent in the melt.

German patent document DE 38 01 840 A1 relates to a UV-transparent borosilicate glass, for which sugar and metallic aluminum are used as the reducing agent, with a composition of 64 wt % to 66.5 wt % of $SiO_2$ and 20 wt % to 22.5 wt % of $B_2O_3$. The coefficient of thermal expansion is between $3.8*10^{-6}/K$ and $4.5*10^{-6}/K$.

U.S. Pat. No. 4,925,814 describes a UV-transmissive glass comprising 60 mol % to 70 mol % of $SiO_2$ and 16 mol % to 20 mol % of $B_2O_3$. The coefficient of thermal expansion is in the range from $4.7*10^{-6}/K$ to $6.2*10^{-6}/K$.

German patent application DE 10 2009 021 115 A1 discloses silicate glasses with high transmittance in the UV range. The glasses have an $SiO_2$ content between 65 wt % and 77 wt %, a $B_2O_3$ content between 0.5 wt % and 8 wt %, and furthermore a high content of alkali and alkaline earth metal ions. The coefficient of thermal expansion is between $9*10^{-6}/K$ and $10*10^{-6}/K$. In order to reduce trivalent iron to divalent iron, carbon or metallic silicon is added.

German patent document DE 10 2012 219 614 B4 discloses a solarization-resistant borosilicate glass. The composition of this glass comprises 65 wt % to 85 wt % of $SiO_2$ and 7 wt % to 20 wt % of $B_2O_3$. Solarization resistance is achieved by a defined position of the UV edge (5% transmittance at about 280 nm, 0% transmittance at 256 nm, with a thickness of the glass of 1.3 mm). Thus, the glass does not transmit UV-C radiation. The specific location of the UV edge is achieved by a combination of $TiO_2$, $MoO_3$, and $V_2O_5$.

German patent application publication DE 25 19 505 describes a UV-transparent borosilicate glasses comprising 61 wt % to 70 wt % of $SiO_2$ and 0.5 wt % to 3.5 wt % of $B_2O_3$, and an organic reducing agent is added to the glass. After UV irradiation the glass exhibits little solarization.

German patent application publication DE 38 26 586 A1 describes UV-transmissible alkali boro-aluminosilicate glasses. The coefficient of thermal expansion is in a range from $5.2*10^{-6}/K$ to $6.2*10^{-6}/K$, while the content of $SiO_2$ is between 58 wt % and 62 wt %, and the content of $B_2O_3$ is between 15 wt % and 18 wt %. UV transmittance is at least 80% at a wavelength of 254 nm for a glass having a thickness of 1 mm. However, the glasses described therein have high coefficients of thermal expansion between $5.6*10^{-6}/K$ and $6.2*10^{-6}/K$.

International patent application WO 2016/115685 A1 discloses glasses with a low coefficient of thermal expansion and at the same time high UV transmittance and solarization resistance. Two types of glass are described, namely an alkali-free alkaline earth borosilicate glass with a composition of 50 mol % to 75 mol % of $SiO_2$, 5 mol % to 20 mol % of $B_2O_3$ and an alkaline earth oxide content of 3 mol % to 25 mol % on the one hand, and on the other an alkaline earth-free alkali borosilicate glass with a composition of 78 mol % to 85 mol % of $SiO_2$, 5 mol % to 20 mol % of $B_2O_3$ and an alkali oxide content between 0 mol % and 13 mol %. The coefficient of thermal expansion is in the range between $2*10^{-6}/K$ and $4*10^{-6}/K$. UV transmittance is said to be improved by adjusting the number of non-bridging oxygen atoms, that is by influencing the glass network structure. In this case, a transmittance of 51% at 248 nm and 88% at 308 nm was achieved with a high-purity glass with an $Fe_2O_3$ content of less than 0.01 mol %. However, a comparison of the high-purity glasses with glasses having significantly higher $Fe_2O_3$ contents reveals that the latter exhibit significantly reduced transmittance in the UV range, namely 10% at 248 nm and 61% at 308 nm. So, other than described it appears that not so much the number of non-bridging oxygen atoms is decisive for UV transmittance, but rather the content of impurities, in particular in the form of color-imparting ions, such as iron ions. It should be noted that the cited international patent application does not make any statements regarding the content of other color-imparting ions such as other 3d elements.

International Patent Application WO 2017/119399 A1 proposes three different types of glass, which are described as being highly transmissive in the visible spectral range with wavelengths from 380 nm to 780 nm. The described glass of type A is an alkaline earth aluminosilicate glass with high alkali content, the glass of type B is a borosilicate glass with a high alkali content, and the glass of type C is an alkali-free alkaline earth borosilicate glass. A low refractive index is not feasible with these glasses; the exemplary glasses in table 1 of international patent application WO 2017/119399 A1 all have a refractive index of more than 1.5.

International patent application WO 2017/052338 A1 describes a light guide plate made of glass with a composition of 75 wt % to 85 wt % of $SiO_2$, a $B_2O_3$ content of 5 wt % to 20 wt %, between 1 wt % and 5 wt % of $Al_2O_3$, and 3 wt % to 8 wt % of $R_2O$, where R stands for at least one of the elements lithium, sodium, or potassium, and less than 0.0025 wt % of $Fe_2O_3$.

Japanese patent application JP 2010/208906 A proposes a composition for a glass which is resistant to UV radiation. It is a soda-lime glass with a composition in the range of 66 wt % to 75 wt % of $SiO_2$, 0.1 wt % to 30 wt % of $Al_2O_3$, 5 wt % to 15 wt % of $Na_2O$, from 5 wt % to 15 wt % of $R_2O$ (where $R_2O$ is the sum of $Li_2O$, $Na_2O$, and $K_2O$), from 3 wt % to 10 wt % of CaO, between 0 wt % and 7 wt % of MgO, and a content of RO between 3 wt % and 18 wt % (where RO is the sum of the alkaline earth oxides CaO, MgO, BaO, and SrO), a fraction of iron oxides FeO and $Fe_2O_3$ between 0.005 wt % and 0.02 wt % in total, and a content of $TiO_2$ between 0.2 wt % and 2 wt %.

Japanese patent application JP 2015/193521 A discloses highly transmissive borosilicate glasses with a composition range of 50 wt % to 80 wt % of $SiO_2$, a content of 1 wt % to 45 wt % of the sum of $Al_2O_3$ and $B_2O_3$, a content between 0 wt % and 25 wt % of the sum of $Li_2O$, $Na_2O$, and $K_2O$, and a content between 0 wt % and 25 wt % of the sum of alkaline earth oxides MgO, CaO, SrO, and BaO. Furthermore, the sum of $Fe_2O_3$ and $TiO_2$ contents is said to be less than 100 ppm. The exemplary glasses all have a very low content of $SiO_2$ of about 65 wt %, and at the same time a high content of alkali oxides between about 8 wt % and 13 wt %. Accordingly, these are high-expansion glasses with a thermal expansion coefficient between about $5.5*10^{-6}$/K and $7.5*10^{-6}$/K.

International patent application WO 2016/194780 A1 describes borosilicate glasses of high transmittance for electromagnetic radiation, especially in DUV, i.e. in the range of UV-C radiation, which come from the following composition range: $SiO_2$ between 55 mol % and 80 mol %, $B_2O_3$ between 12 mol % and 27 mol %, $Al_2O_3$ between 0 mol % and 3.5 mol %, the sum of the contents of $Li_2O$, $Na_2O$, and $K_2O$ between 0 mol % and 20 mol %, and a content of alkaline earth oxides RO between 0 mol % and 5 mol %. The exemplary glasses all have a high alkaline content and have coefficients of thermal expansion between $4*10^{-6}$/K and $7*10^{-6}$/K.

Furthermore, glass is generally known to have advantageous dielectric properties. In particular special glasses can be used. Presently, silicon components are used as interposers in the semiconductor technology, for example. This process is very well controlled, but silicon has a very high dielectric constant of 11.68 (and possibly very high dielectric losses, depending on the exact design of the material), which limits the use of silicon in high frequency applications.

Also, plastics are increasingly used as substrates and/or interposers. However, these materials have unfavorable mechanical properties, for example in terms of thermomechanics, such as a high coefficient of thermal expansion. Moreover, these materials are easily deformable, i.e. they do not exhibit the dimensional stability that is necessary for the required high precision in the semiconductor and electronics industry.

Moreover, ceramics are also used. However, the homogeneity of ceramics is limited, and in particular they have a heterogeneous microstructure. Especially, ceramics are mostly porous. This can lead to problems related to outgassing of pores, which is particularly disadvantageous in metallization processes. Also, the dielectric constants of common ceramics are usually excessively high. Ceramics are often found in power applications, due to their significantly higher thermal conductivity compared to glasses.

Even glasses have already being used. For example, the use of borosilicate glass is known, which is marketed under the name Borofloat 33, or of AF 32 which is an alkali-free alkaline earth aluminosilicate glass, or of the glass "EAGLE" from Corning. However, these glasses also have excessively high dielectric constants of more than 4.5 and lead to high dielectric losses of 0.01 or more at a frequency of 24 GHz.

International patent application WO 2018/051793 A1 discloses a glass substrate for high-frequency components and a corresponding printed circuit board. The glass substrate has a very low roughness Ra of 1.5 nm or less. However, in order to achieve such a low roughness, the substrate has to be post-treated, in particular polished.

In particular pure quartz glass (also known as silica glass) which comprises only $SiO_2$ has advantageous dielectric properties. However, the melting point of this material is much too high, and therefore it cannot be produced in the form of a flat glass, neither in terms of economics nor technologically.

Therefore, there is a need for a flat glass which overcomes or at least mitigates the aforementioned problems of the prior art, and which in particular combines a low dielectric constant preferably with a low dielectric loss factor, and which in particular preferably can be produced economically and technologically.

SUMMARY

Accordingly, the invention relates to the use of a flat glass for producing an electronic component, wherein the flat glass is in particular used as an interposer and/or as a substrate and/or superstrate, wherein the flat glass has a dielectric constant E of less than 4.3 and a dielectric loss factor tan $\delta$ of 0.004 or less at 5 GHz, wherein the electronic component in particular constitutes or comprises an antenna, for example a patch antenna, or an array of antennas, or a phase shifter element, in particular a liquid crystal-based phase shifter element.

Here, the dielectric loss factor of the flat glass according to the present invention was measured at a frequency of 5 GHz. As an approximation, the frequency dependence of dielectric loss in the GHz range can be described by the loss, i.e. tan $\delta$, being proportional to the frequency.

The use of such a flat glass, for example as a substrate for electronic packaging, i.e. for the packaging of electronic components, for antennas, and also for heterogeneous integration of semiconductor devices, passive elements such as insulators or capacitors, and finally for antenna components, brings benefits both in terms of performance and in terms of the manufacturing of these components. Decisive properties of the glass to be used are in particular a low dielectric constant and a low dielectric loss factor. The described glasses are likewise suitable for other RF applications such as RF filters, capacitors, and coils.

Such glasses with a low dielectric constant and low dielectric loss factor can find application for: fan-out packages, i.e. one or more semiconductor chip(s) embedded in one or more cut-outs in a thin glass plate; packages comprising thin glass as the substrate material, wherein semiconductor chips may be applied on at least one or even on both faces of the glass substrate; flip-chip packages on glass substrates; glass interposers, i.e. glass as an interlayer in a package for semiconductor and/or other electrical or dielectric components, wherein the glass substrate includes at least one, usually a multitude of vias, in particular metallized vias; glass packages using glass or glass substrates with thermally conductive vias, in particular for high power density applications; filters with integrated matching inductances, in particular bulk acoustic wave (BAW) filters; telecommunication applications (e.g. smart phones) for combining filter elements with low noise amplifiers; opto-electronic components with optic waveguides that are integrated in the glass substrate and/or in the glass (e.g. waveguides operating in the telecommunications C-band at 1550 nm); opto-electronics in which optical transparency is exploited for transmitting optical signals through the glass; heterogeneous integration including different semiconductor materials (e.g. Si and GaAs for high-frequency and/or high-speed applications and/or SiC for high power components); heterogeneous integration using silicon semiconductors fabricated with different minimum feature sizes (e.g. memory chips provided in 14 nm node technology combined with high-power and/or logic components provided in 60 nm node technology or more); heterogeneous integration comprising different active (semiconductor chips) and passive components (capacitors, inductors, resistors, circulators, antennas . . . ); combining memory and logic chips in a single package with high data rates; use of the glass or glass substrate as a mechanical stiff layer or core in a package so that multiple redistribution layers (e.g. Ajinomoto build-up films—ABF) and/or metallizations are or may be applied on one face or on both faces of the glass; use of a glass or glass substrate as a mechanical stiff layer or core in a package to achieve small fabrication tolerances of less than 5 □m in the redistribution or rewiring layers; use in applications with very high data rates in the range of multiple Gbps where delay becomes important, since delay is roughly proportional to the square root of the (real part) of the dielectric constant; use in applications with very high data rates in the range of multiple Gbps; due to the low dielectric constant there will be fewer parasitic capacitances; antenna arrays for automotive radar systems with radar beam steering and spatial resolution (e.g. at 77 GHz); packages for car-to-car communication and for autonomous driving; packages for antenna arrays for gesture control and gesture recognition (e.g. at 60 GHz); and metalized signal lines applied and patterned on glass (e.g. as a 50 ohm microstrip line) with low attenuation (e.g. attenuation of less than 50 dB/m at 24 GHz, less than 200 dB/m at 77 GHz, and less than 300 dB/m at 100 GHz).

In the context of the present invention, the following definitions shall apply:

In the context of the present invention, the transition metals of the 3rd period of the periodic table are also referred to as "3d elements" or "3d metals", for short. Transition metals are understood to mean the metals of atomic numbers 21 to 30, 39 to 48, 57 to 80, and 89, and 104 to 112 in the context of the present invention.

For the purposes of the present invention, flat glass is understood to mean a glass body having a geometrical dimension in one spatial direction that is at least one order of magnitude smaller than in the other two spatial directions. In simple terms, therefore, the glass body has a thickness that is at least an order of magnitude smaller than its length and width. Flat glasses may for example come in the form of a ribbon so that their length is considerably greater than their width, or length and width may be of approximately the same magnitude, so that the flat glass is provided as a sheet.

In particular, flat glass is understood to mean a glass which is obtained as a sheet-like or ribbon-shaped body already from the production process. Therefore, not every sheet-like or ribbon-shaped body is to be understood as a flat glass in the sense of the present invention. For example, it would also be possible to prepare a glass sheet from a glass block by cutting and then grinding and/or polishing. However, such a flat ribbon-shaped body or sheet-like glass body differs significantly from a flat glass in the sense of the present invention. More particularly, a flat glass in the sense of the invention is obtained by a melting process with subsequent hot forming, in particular by a float process, a rolling process, or a drawing process, such as a down-draw process, preferably an overflow fusion down-draw process, or an up-draw process, or a Foucault process. The flat glass may have a fire-polished surface, or else the surface may be treated after the hot-forming process in a cold post-processing step. The surface finish of the flat glass will differ depending on the selected hot forming process.

If reference is made to the coefficient of thermal expansion in the context of the present application, this is the coefficient of linear thermal expansion a, unless expressly stated otherwise, which is given for the range from 20° C. to 300° C. unless expressly stated otherwise. The expressions CTE, $\alpha$, and $\alpha_{20-300}$, and also generally 'thermal expansion coefficient' are used synonymously in the context of the present invention. The given value is the nominal coefficient of mean thermal expansion according to ISO 7991, which is determined by static measurement.

The transformation temperature $T_g$ is defined by the point of intersection of the tangents to the two branches of the expansion curve when measured at a heating rate of 5 K/min. This corresponds to a measurement according to ISO 7884-8 or DIN 52324.

Thus, according to the present invention, the flat glass is a flat, sheet-like or ribbon-shaped glass body which may in particular have native surfaces. In the context of the present invention, the two basic faces of the glass body are referred to as the surfaces of the flat glass, i.e. those surfaces which are defined by the length and the width of the glass body. The edge surfaces are not understood to be surfaces in this sense. First, they only account for a very small percentage area of the flat glass body, and second, flat glass bodies are usually cut into desired sizes according to customer or manufacturing specifications, from the flat glass body obtained from the manufacturing process, i.e. usually a glass ribbon.

The provisioning of the glass in the form of a flat glass according to the present invention has far-reaching advantages. Complex preparation steps are eliminated, which are not only time-consuming but also costly. Also, geometries feasible by the common flat glass manufacturing processes are easily accessible, especially large dimensions of the flat glass. Moreover, native surfaces of a glass, which are also referred to as fire-polished, determine the mechanical properties of the glass body, for example, while reworking of the surface of a glass usually leads to a significant loss in strength. So, the flat glass according to the present invention preferably has a higher strength compared to reworked glasses.

According to one embodiment of the invention, the flat glass comprises oxides of network formers, in particular oxides of silicon and/or boron, in a content of at most 98 mol %.

Here, network formers are understood in Zachariasen's sense, i.e. they comprise cations predominantly having a coordination number of 3 or 4. These are in particular the cations of elements Si, B, P, Ge, As. Hereby, network formers are distinguished from network modifiers, such as Na, K, Ca, Ba, which usually have coordination numbers of 6 and more, and from intermediate oxides such as of Al, Mg, Zn, which mostly have oxidation numbers from 4 to 6.

With such a maximum content of oxides of network formers in a glass, the glass is feasible both in terms of technology and economics, in particular also in continuous melting units, and is advantageously also suitable for a shaping process.

Meltability is further improved by a reduction of the $SiO_2$ content. According to a preferred embodiment of the invention, the content of $SiO_2$ in the flat glass is between 72 mol % and 85 mol %, in particular preferably between 76 mol % and 85 mol %.

According to a further embodiment, the flat glass comprises $B_2O_3$. Borate glasses have very good optical properties, especially in pure form, and furthermore they are easy to melt. However, their strong hygroscopicity is a drawback. Therefore, preferably, the content of $B_2O_3$ in the flat glass is between 10 mol % and 25 mol %, in particular preferably between 10 mol % and 22 mol %.

Particularly advantageous properties are achieved if a glass contains both $SiO_2$ and $B_2O_3$ as network formers.

In fact, it is practically feasible to obtain $SiO_2$ and $B_2O_3$ as a glass in almost any mixture together with other cations, in particular "alkaline" cations such as $Na^+$, $K^{+t}$, $Li^+$, $Ca^{2+}$. However, if a glass such as a flat glass is to be achieved, the purely practical limits given by the production conditions, in particular with regard to devitrification tendency, meltability, and/or shapability, and chemical resistance have in particular to be considered as well.

Preferably, therefore, the flat glass comprises $SiO_2$ and $B_2O_3$, and particularly preferably the following applies: $\Sigma(SiO_2+B_2O_3)$ is 92 mol % to 98 mol %.

What is also important for the addressed applications in electronics is the alkali migration of a glass, i.e. the property of a glass to release alkalis at the surface and/or the mobility of the alkalis in the glass matrix itself. In particular, a high proportion of alkalis and/or a high mobility of alkalis leads to increased dielectric loss. Therefore, it is preferred to use a flat glass in which the content of alkalis is limited.

According to one embodiment, the following applies for the flat glass: $\Sigma R_2O$ 1 mol %-5 mol %, wherein $R_2O$ stands for alkali metal oxides.

What is also of importance with regard to alkali migration, but also with regard to advantageous mechanical properties, such as low deformability of the flat glass, or its deformation stability, is in particular an exact adjustment of the ratio of the individual constituents included in the flat glass, and/or the following applies with regard to the ratio of the molar amounts of the constituents of the flat glass:

| | |
|---|---|
| $B_2O_3/SiO_2$ | 0.12 to 0.35, and/or |
| $\Sigma(Me_xO_y)/(\Sigma(SiO_2 + B_2O_3)$ | 0.02 to 0.10, |

wherein Me represents a metal which usually has an oxidation number y in oxides, in particular one of an alkali metal and/or alkaline earth metal, and aluminum.

According to one embodiment, the following applies with regard to a ratio of weight fractions of iron ions contained in the flat glass: $0.1 \leq Fe2+/(Fe2++Fe3+) \leq 0.3$, wherein preferably the total content of the iron ions contained in the flat glass is less than 200 ppm, preferably less than 100 ppm, yet more preferably less than 50 ppm, with the ppm being based on mass.

According to yet another embodiment, the following applies with regard to the weight fractions, in ppm, of metals Fe, Co, Ni, Cr, Cu, Mn, V contained in the flat glass:

$$\Sigma(1{*}Fe+300{*}Co+70{*}Ni+50{*}Cr+20{*}Cu+5{*}Mn+2{*}V) \text{ [ppm by mass]}$$

is less than 200 ppm, preferably less than 150 ppm, more preferably less than 100 ppm, yet more preferably less than 50 ppm, and most preferably less than 25 ppm; wherein the total content of the considered metals in the flat glass is considered irrespective of the oxidation state thereof.

In other words, according to one embodiment, the total of all metal oxides in the flat glass is minimized and is small compared to the total of the main components.

Here, "Me" refers to a metal which is usually present in oxides with the oxidation number y. In particular, Me may be an alkali metal or an alkaline earth metal, or else aluminum, for example. As a matter of fact, it is also possible that the glass composition comprises a plurality of metal ions "Me". The term "metal ion" is understood to be independent of the oxidation number, so that the flat glass may comprise the respective substance in metallic form, for example, but especially also in the form of an ion or an oxide. Usually, metals will be present in the form of ions in the oxidic glasses that are considered here. It should also be taken into account that the ions occur in different oxidation states (so-called polyvalent ions), especially in the case of the transition metals. In this sense, the wording "usual oxidation number" means the one with which a respective oxide is usually specified or designated, for example when an analysis of a composition is given. For example, the content of chromium of a glass, such as a flat glass, is usually given as a percentage of $Cr_2O_3$ (i.e. with the oxidation number 3 of chromium), even if other oxidation numbers are possible. In the context of the present invention, unless expressly stated otherwise, always the total content of a substance is indicated, irrespective of its oxidation state.

A molar ratio of $B_2O_3$ to $SiO_2$ within the limits between 0.12 and 0.35 is particularly advantageous because it is possible in this way to prevent or at least minimize structural inhomogeneities that might arise due to demixing processes, for example, which may occur in the system $SiO_2$—$B_2O_3$ as well as in ternary systems which comprise yet another metal oxide $Me_xO_y$ in addition to $SiO_2$ and $B_2O_3$.

According to a further embodiment, the transformation temperature $T_g$ of the flat glass is between 450° C. and 550° C.

Preferably, the flat glass has a viscosity $\eta$, and Ig $\eta$ has a value of 4 at temperatures between 1000° C. and 1320° C.

Glasses that have a transformation temperature $T_g$ and/or a viscosity $\eta$ in the aforementioned limits exhibit particularly good processability, so that glasses with such material constants are particularly suitable for being processed into flat glasses. In particular, it is possible in this way to produce flat glasses with a particularly low surface roughness $R_a$ of less than 2 nm.

According to another embodiment of the invention, the flat glass is distinguished by the following values of chemical resistance of the flat glass:

against water according to DIN ISO 719 class HGB 1;
against acids according to DIN 12116 class S 1 W; and
against alkalis according to DIN ISO 695 class A3 or better.

Such (high) values of chemical resistance of the flat glass are advantageous, since in this way the flat glass can be applied in diverse processes in which partly aggressive media might come into contact with the surface of the flat glass, for example in the chip industry, but also in other fields. In particular the low content of alkalis in the flat glass is of advantage here. However, not only the content of alkalis in a glass, e.g. a flat glass, is decisive for its chemical resistance, but also the type of bonding of the alkalis in the glass matrix. The high values for chemical resistance of the flat glass according to one embodiment are thus attributable to a low total alkali content on the one hand in combination with the particularly strong structural bonding of the alkalis in the glass matrix on the other hand.

Preferably, the flat glass comprises the following constituents:

| | |
|---|---|
| $SiO_2$ | 72 mol % to 85 mol %, preferably 76 mol % to 85 mol %, |
| $B_2O_3$ | 10 mol % to 25 mol %, preferably 10 mol % to 22 mol %, |
| $Al_2O_3$ | 0.2 mol % to 2.5 mol %, |
| $Na_2O$ | 0.5 mol % to 5.0 mol %, |
| $K_2O$ | 0 mol % to 1.0 mol %, |
| $Li_2O$ | 0 mol % to 1.5 mol %, |

wherein, preferably, the total of alkali metal oxides $Na_2O$, $K_2O$, $Li_2O$ contained in the flat glass, preferably the total of all alkali metal oxides contained in the flat glass, amounts to less than 5 mol %.

For use of a flat glass in electronics, for example in electronic packaging, the flatness of the flat glass is also important. A measure of the quality of flatness is known as 'total thickness variation', also referred to as ttv or (total) thickness variance in the context of the present invention. The flat glass preferably exhibits a total thickness variance of less than 10 μm over a surface area of 100,000 $mm^2$, preferably less than 8 μm over a surface area of 100,000 $mm^2$, and most preferably less than 5 μm over a surface area of 100,000 $mm^2$.

Roughness of the flat glass is also of particular importance in the electronics industry, especially if the flat glass serves as a substrate for applying coatings, for example. Especially the adhesion of layers and/or layer packages is determined by the surface quality of the substrate, i.e. the flat glass in this case. At very high frequencies of in particular greater than 10 GHz or even greater than 50 GHz, high roughness at the interface between the substrate, i.e. a flat glass in this case, and a metallization will lead to increased loss. According to a further embodiment of the invention, the flat glass therefore has a roughness, $R_a$, value of less than 2 nm.

The surfaces of the flat glass are preferably native surfaces and are in particular fire-polished.

Here, surfaces of the flat glass are understood to mean those surfaces which are defined by the length and width of the glass body defining the flat glass. Edge surfaces of the flat glass do not constitute surfaces in the sense of the present invention. The edge surfaces usually result from cutting processes. Native surfaces, by contrast, are those surfaces which result from the production process itself, i.e. from the hot forming of a glass, and which in particular are not subject to any mechanical post-processing, in particular no polishing and/or grinding. Preferably, the surfaces of the flat glass have a fire-polished quality.

For applications in the chip industry it is also advantageous if the substrate, i.e. the flat glass in the present case, allows for a debonding process using UV. For this purpose, the substrate, i.e. the flat glass, for example, need to be UV-transparent.

According to one embodiment, at a thickness of the flat glass of 1 mm, the flat glass exhibits a transmittance to electromagnetic radiation which is 20% or more, preferably 60% or more, more preferably 85% or more, and most preferably 88% or more at a wavelength of 254 nm; and/or which preferably is 82% or more, preferably 90% or more, more preferably 91% or more at a wavelength of 300 nm; and/or which preferably is 90% or more, preferably 91% or more at a wavelength of 350 nm; and/or which preferably is 92% or more, preferably 92.5% or more at a wavelength of 546 nm; and/or which preferably is 92.5% or more, preferably 93% or more at a wavelength of 1400 nm; and/or which preferably is 91.5% or more, preferably 92% or more in a wavelength range from 380 nm to 780 nm; and/or which preferably is 92.5% or more, preferably 93% or more in a wavelength range from 780 nm to 1500 nm.

Thicker or thinner flat glasses also come within the scope of this embodiment, if these thicker or thinner flat glasses also exhibit the aforementioned values at a thickness of 1 mm.

For determining whether they are within the scope of protection, thicker flat glasses can be thinned out to a thickness of 1 mm.

Thinner flat glasses can also be brought to a thickness of 1 mm, by stacking and possibly thinning, so that instead of converting it is also possible to make a physical measurement of transmittance to determine whether these thin flat glasses are within this scope of protection.

According to one embodiment, the flat glass is produced or producible by a melting process with subsequent hot forming, in particular in a float process, a rolling process, or a drawing process such as a down-draw process, preferably an overflow fusion down-draw process, or an up-draw process, or a Foucault process.

EXAMPLES

A flat glass according to one embodiment has the following composition, in % by weight:

| | |
|---|---|
| $SiO_2$ | 80.9 wt % |
| $B_2O_3$ | 15.1 wt % |
| $Al_2O_3$ | 1.1 wt % |
| $Na_2O$ | 2.8 wt % |

Dielectric loss factor tan δ is 0.0026 at 1 GHz, 0.0028 at 2 GHz, and 0.0033 at 5 GHz. Dielectric constant E is 4.1.

A flat glass according to a further embodiment has the following composition, in % by weight:

| | |
|---|---|
| $SiO_2$ | 81.7 wt % |
| $B_2O_3$ | 14.7 wt % |
| $Al_2O_3$ | 1.1 wt % |
| $Na_2O$ | 1.2 wt % |
| $K_2O$ | 0.9 wt % |
| $Li_2O$ | 0.4 wt % |

Dielectric loss factor tan δ is 0.0025 at 5 GHz. Dielectric constant E is 4.1.

A flat glass according to yet another embodiment has the following composition, in % by weight:

| | |
|---|---|
| $SiO_2$ | 74.9 wt % |
| $B_2O_3$ | 21.8 wt % |
| $Al_2O_3$ | 1.1 wt % |
| $Na_2O$ | 1.1 wt % |
| $K_2O$ | 0.8 wt % |
| $Li_2O$ | 0.5 wt % |

Dielectric loss factor tan δ is 0.0017 at 5 GHz. Dielectric constant E is 3.94.

What is claimed is:

1. A method of producing an electronic component, selected from alimited group, the method comprising:

providing flat glass comprising silicon oxide, boron oxide, aluminum oxide, sodium oxide, potassium oxide and lithium oxide in the following amounts:

| | |
|---|---|
| $SiO_2$ | 72 mol % to 85 mol %, |
| $B_2O_3$ | 10 mol % to 25 mol %, |
| $Al_2O_3$ | 0.2 mol % to 2.5 mol %, |
| $Na_2O$ | 1.1 mol % to 2.8 mol %, |
| $K_2O$ | 0 mol % to 1.0 mol %, and |
| $Li_2O$ | 0 mol % to 1.5 mol %, |

wherein the $Na_2O$, $K_2O$, and $Li_2O$ amount to less than 5 mol % in total, wherein the flat glass has a ratio of weight fractions of ions of iron that satisfies the equation $0.1 \leq Fe^{2+}/(Fe^{2+}+Fe^{3+}) \leq 0.3$;

configuring the flat glass as one of an interposer, a substrate, or a superstrate; and forming the flat glass into the electronic component, wherein the electronic component is selected from the limited group consisting of an antenna, a patch antenna, an array of antennas, a phase shifter element, and a liquid crystal-based phase shifter element, wherein the flat glass, at a thickness of 1 mm, exhibits a first transmittance to electromagnetic radiation at a wavelength of 254 nm of 20% or more, exhibits a second transmittance to electromagnetic radiation at a wavelength of 300 nm of 82% or more, and exhibits a third transmittance to electromagnetic radiation at a wavelength of 350 nm of 90% or more, and wherein the flat glass has a native surface, and wherein the flat glass has a dielectric constant between 3.94 to 4.3 and has a dielectric loss factor of 0.004 or less at 5 GHz.

2. The method of claim 1, wherein the step of providing the flat glass comprises providing glass having a content of oxides of network formers of not more than 98 mol % in total.

3. The method of claim 2, wherein the oxides of network formers comprise the oxides of silicon and/or boron.

4. The method of claim 1, wherein the step of providing the flat glass comprises providing glass having a $B_2O_3$ content between 10 mol % and 25 mol % and/or a content of $SiO_2$ and $B_2O_3$ where $\Sigma(SiO_2+B_2O_3)$ is 92 mol % to 98 mol %.

5. The method of claim 1, wherein the step of providing the flat glass comprises providing glass having $\Sigma R_2O$ between 1 mol % and 5 mol %, wherein $R_2O$ stands for alkali metal oxides.

6. The method of claim 1, wherein the step of providing the flat glass comprises providing glass having a ratio of molar amount of $B_2O_3/SiO_2$ that is 0.12 to 0.35.

7. The method of claim 1, wherein the step of providing the flat glass comprises providing glass having a ratio of molar amount where $\Sigma(Me_xO_y)/(\Sigma(SiO_2+B_2O_3)$ is 0.02 to 0.10, wherein Me is selected from a group consisting of an alkali metal, an alkaline earth metal, and aluminum.

8. The method of claim 1, wherein the flat glass comprises a total content of iron ions less than 200 ppm based on mass.

9. The method of claim 8, wherein the glass comprises $\Sigma(1{*}Fe+300{*}Co+70{*}Ni+50{*}Cr+20{*}Cu+5{*}Mn+2{*}V)$ [ppm by mass] that is less than 200 ppm, wherein a total content of metals is considered irrespective of an oxidation state thereof.

10. The method of claim 1, wherein the flat glass has a transformation temperature between 450° C. and 550° C.; and/or has a viscosity η, wherein Ig η has a value of 4 at temperatures between 1000° C. and 1320° C.

11. The method of claim 1, wherein the flat glass exhibits a value of chemical resistance against water according to DIN ISO 719 class HGB 1; exhibits a value of chemical resistance against acids according to DIN 12116 class S 1 W; and exhibits a value of chemical resistance against alkalis according to DIN ISO 695 class A3 or better.

12. The method of claim 1, wherein the flat glass exhibits a total thickness variance of less than 10 μm over a surface area of 100,000 $mm^2$.

13. The method of claim 1, wherein the flat glass exhibits a total thickness variance of less than 5 μm over a surface area of 100,000 $mm^2$.

14. The method of claim 1, wherein the flat glass has a roughness value of less than 2 nm.

15. The method of claim 1, wherein the step of providing the flat glass further comprises fire-polishing surfaces of the flat glass.

16. The method of claim 1, wherein the flat glass, at a thickness of 1 mm, exhibits a fourth transmittance to electromagnetic radiation at a wavelength of 546 nm of 92% or more; and/or a fifth transmittance to electromagnetic radiation at a wavelength of 1400 nm of 92.5% or more; and/or a sixth transmittance to electromagnetic radiation in a wavelength range from 380 nm to 780 nm of 91.5% or more; and/or a seventh transmittance to electromagnetic radiation in a wavelength range from 780 nm to 1500 nm of 92.5% or more.

17. The method of claim 1, wherein the step of providing the flat glass further comprises producing the flat glass by a melting process with a subsequent hot forming process.

18. The method of claim 17, wherein the subsequent hot forming process is selected from a group consisting of a float process, a rolling process, a drawing process, a down-draw process, an overflow fusion down-draw process, an up-draw process, and a Foucault process.

19. A method of producing an electronic component selected from a limited group the method comprising:

providing flat glass comprising silicon oxide, boron oxide, aluminum oxide, sodium oxide, potassium oxide and lithium oxide in the following amounts:

| | |
|---|---|
| $SiO_2$ | 72 mol % to 85 mol %, |
| $B_2O_3$ | 10 mol % to 25 mol %, |
| $Al_2O_3$ | 0.2 mol % to 2.5 mol %, |

-continued

| | |
|---|---|
| $Na_2O$ | 1.1 mol % to 2.8 mol %, |
| $K_2O$ | 0 mol % to 1.0 mol %, and |
| $Li_2O$ | 0 mol % to 1.5 mol %, |

wherein the $Na_2O$, $K_2O$, and $Li_2O$ amount to less than 5 mol % in total, wherein the flat glass has a ratio of weight fractions of ions of iron that satisfies the equation $0.1 \leq Fe^{2+}/(Fe^{2+}+Fe^{3+}) \leq 0.3$, and wherein the flat glass has a dielectric constant of 4.3 or less and has a dielectric loss factor of 0.004 or less at 5 GHZ;

configuring the flat glass as one of an interposer, a substrate, or a superstrate; and forming the flat glass into the electronic component, wherein the electronic component is selected from the limited group consisting of an antenna, a patch antenna, an array of antennas, a phase shifter element, and a liquid crystal-based phase shifter element, wherein the flat glass, at a thickness of 1 mm, exhibits a first transmittance to electromagnetic radiation at a wavelength of 254 nm of 20% or more, exhibits a second transmittance to electromagnetic radiation at a wavelength of 300 nm of 82% or more, and exhibits a third transmittance to electromagnetic radiation at a wavelength of 350 nm of 90% or more, and wherein the flat glass has a native surface, and wherein the third transmittance is 91% or more.

20. The method according to claim 1, wherein the native surface comprises a fire-polished native surface.

21. The method according to claim 19, wherein the native surface comprises a fire-polished native surface.

22. An electronic component produced according the method of claim 19, the electronic component comprising a flat glass comprising:

| | |
|---|---|
| $SiO_2$ | 72 mol % to 85 mol %, |
| $B_2O_3$ | 10 mol % to 25 mol %, |
| $Al_2O_3$ | 0.2 mol % to 2.5 mol %, |
| $Na_2O$ | 1.1 mol % to 2.8 mol %, |
| $K_2O$ | 0 mol % to 1.0 mol %, and |
| $Li_2O$ | 0 mol % to 1.5 mol %, |

wherein the $Na_2O$, $K_2O$, and $Li_2O$ amount to less than 5 mol % in total, wherein the glass has a ratio of weight fractions of ions of iron that satisfies the equation $0.1 \leq Fe^{2+}/(Fe^{2+}+Fe^{3+}) \leq 0.3$, wherein the flat glass has a dielectric constant of between 3.94 to 4.1 and a dielectric loss factor of 0.004 or less at 5 GHz, and wherein the flat glass, at a thickness of 1 mm, exhibits a first transmittance to electromagnetic radiation at a wavelength of 254 nm of 20% or more, exhibits a second transmittance to electromagnetic radiation at a wavelength of 300 nm of 82% or more, and exhibits a third transmittance to electromagnetic radiation at a wavelength of 350 nm of 90% or more.

* * * * *